(12) United States Patent  
Sekita

(10) Patent No.: US 7,559,069 B2  
(45) Date of Patent: Jul. 7, 2009

(54) OPTICAL DISC DEVICE

(75) Inventor: Naotoka Sekita, Saitama (JP)

(73) Assignee: TEAC Corporation, Musashino-shi (JP)

( * ) Notice: Subject to any disclaimer, the term of this patent is extended or adjusted under 35 U.S.C. 154(b) by 583 days.

(21) Appl. No.: 11/372,303

(22) Filed: Mar. 9, 2006

(65) Prior Publication Data

US 2006/0206907 A1     Sep. 14, 2006

(30) Foreign Application Priority Data

Mar. 11, 2005     (JP) .............................. 2005-068448

(51) Int. Cl.
G11B 17/056     (2006.01)
G11B 33/12     (2006.01)
G11B 33/14     (2006.01)
G11B 7/085     (2006.01)

(52) U.S. Cl. ...................... 720/671; 720/648; 720/653

(58) Field of Classification Search ................... 369/71; 720/648, 671, 653
See application file for complete search history.

(56) References Cited

U.S. PATENT DOCUMENTS

| 5,615,196 | A | * | 3/1997 | Kato ............................. 369/71 |
| 5,995,467 | A | * | 11/1999 | Ohyama et al. ............... 369/71 |
| 6,219,327 | B1 | * | 4/2001 | Kim et al. ..................... 720/671 |
| 6,388,980 | B2 | * | 5/2002 | Otani et al. .................. 720/603 |
| 6,404,723 | B1 | * | 6/2002 | Morishita .............. 369/112.23 |
| 6,430,143 | B1 | * | 8/2002 | Kajiyama et al. ........... 720/671 |
| 6,445,674 | B1 | * | 9/2002 | Morita ........................ 720/671 |
| 6,487,158 | B2 | * | 11/2002 | Begley ....................... 720/680 |
| 7,103,895 | B2 | * | 9/2006 | Osada et al. ................ 720/671 |
| 2005/0005281 | A1 | * | 1/2005 | Tabor et al. ................. 720/671 |

FOREIGN PATENT DOCUMENTS

| JP | 02310831 | A | * | 12/1990 |
| JP | 9-288836 | | | 11/1997 |
| JP | 2000057620 | A | * | 2/2000 |
| JP | 2000076696 | A | * | 3/2000 |
| JP | 2000195082 | A | * | 7/2000 |
| JP | 2002298409 | A | * | 10/2002 |
| JP | 2003288777 | A | * | 10/2003 |
| JP | 2004310890 | A | * | 11/2004 |

* cited by examiner

*Primary Examiner*—William J Klimowicz
(74) *Attorney, Agent, or Firm*—Christensen O'Connor Johnson Kindness PLLC

(57) ABSTRACT

A tray unit is slidably attached to a frame. The tray unit comprises a disc tray which slides with respect to the frame, and a pickup unit supported by a damper to the disc tray. The pickup unit includes a shutter for closing an opening through which an optical pickup is exposed when the disc tray is drawn out of the frame. The shutter is opened or closed according to a condition of contact between a tip of a shutter opening/closing lever projecting from a side wall of the disc tray and a cam fixed on the frame.

10 Claims, 12 Drawing Sheets

FIG. 14
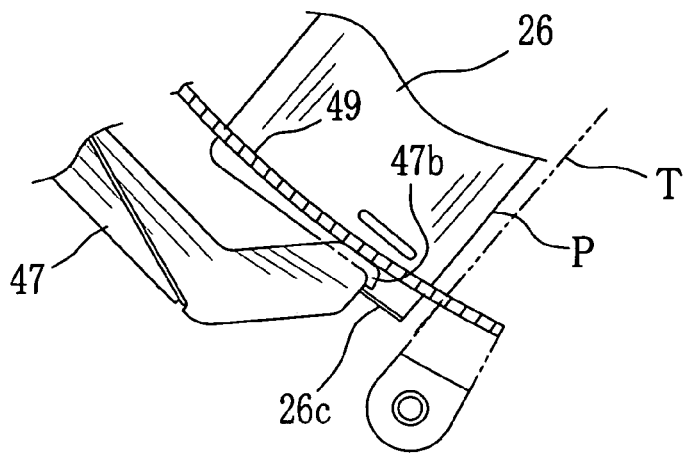
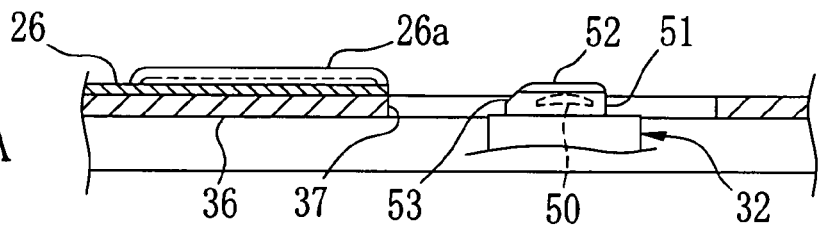
FIG. 15A
FIG. 15B
FIG. 16A  FIG. 16B
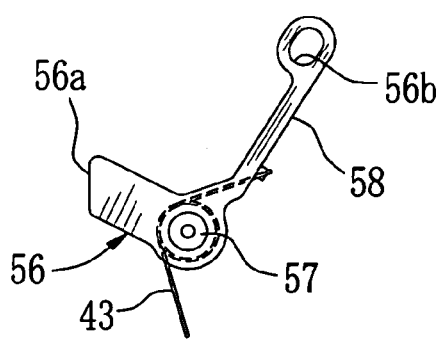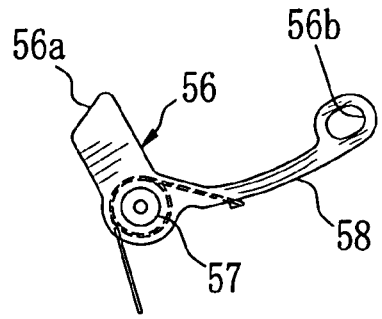

OPTICAL DISC DEVICE

FIELD OF THE INVENTION

The present invention relates to an optical disc device with use of an optical pickup to reproduce data recorded on an optical disc or to record data on an optical disc.

DESCRIPTION RELATED TO THE PRIOR ART

An optical disc such as CD-R or DVD is widely used as a storage media for a personal computer or the like. Recently, an optical disc device is incorporated in not only a desktop personal computer but also a portable personal computer (called the notebook computer). The optical disc device comprises a disc rotation mechanism and an optical pickup. The disc rotation mechanism rotates the optical disc loaded on a disc tray at high speed. The optical pickup emits laser light toward the optical disc to record data on the optical disc, or emits laser light toward the optical disc and receives the laser light reflected from the optical disc to read out data on the optical disc, while moving in a radius direction of the optical disc. In case that the optical disc device is applied to the notebook computer which is required to be slim, the disc tray is slidably incorporated in a computer body. Accordingly, the disc tray is drawn out from the computer body for loading or ejecting the optical disc, and is contained within the computer body for using the optical disc.

The optical pickup emits laser light from a light source to a data-recording surface of the optical disc through an objective lens, or receives the laser light reflected from the optical disc. Accordingly, if dirt and dust adhere to the surface of the objective lens, it is possible that the optical pickup cannot function well. Further, if foreign substances are entered into a moving mechanism for moving the optical pickup in the radius direction of the optical disc, it is also possible that the optical pickup will malfunction. When the optical disc is in use, there is no problem because the optical pickup is contained in the computer body along with the disc tray. However, for loading or ejecting of the optical disc, the objective lens of the optical pickup is exposed through an opening formed on the disc tray, because the optical pickup is drawn from the computer body along with the disc tray. Accordingly, there is a possibility that a user carelessly touches the objective lens of the optical pickup, or that foreign substances and dust enter into the moving mechanism for the optical pickup, at the time of loading or ejecting the optical disc.

In considering this problem, Japanese Patent Laid-Open Publication 09-288836 discloses the optical disc device having a shutter for covering an opening through which laser light is casted to the optical disc from the optical pickup. The shutter covers the opening (the shutter is at a closing position) while a lid of the optical disc device is opened, to prevent the optical pickup from being exposed. The shutter moves to the closing position in mechanical conjunction with an opening move of the lid of the optical disc device, to cover the optical pickup and its whole moving path. Accordingly, it is prevented that the user touches the objective lens of the optical pickup, or that foreign substances and dust enter into the moving mechanism for the optical pickup. In addition, since the shutter is opened in conjunction with a closing move of the lid of the optical disc device, the user is only required to operate this optical disc device in the same manner as the conventional optical disc device with no shutter.

However, in the Japanese Patent Laid-Open Publication 09-288836, the shutter for covering the optical pickup is mechanically interlocked with the lid of the optical disc device through an interlocking mechanism including a gear and a cam. In this construction, vibrations caused by the drive of a spindle motor for rotating the optical disc or an advancing motor for moving the optical pickup are transmitted to the lid or the outside of the optical disc device, which possibly vibrates a case of the optical disc device or generates annoying noises. Further, a shock applied to the lid or a case of the optical disc device is transmitted to the shutter, and the optical disc or the optical pickup may be adversely affected. In addition, as stated above, the disc tray is slidably incorporated in the computer body in the notebook computer which is required to be slim, to reduce its installation space. In case that the shutter is applied to this slide-type optical disc device, a mechanism for opening/closing the shutter is required to be sufficiently compact, in addition to surely open/close the optical pickup in conjunction with drawing/closing moves of the disc tray.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A main object of the present invention is to provide an optical device having a shutter which covers an optical pickup in conjunction with an opening operation of a disc tray, and opens a shutter for the optical pickup when the disc tray is closed so that the optical pickup can access an optical disc, while preventing an adverse effect on the optical disc or the optical pickup by vibrations or shocks from outside.

Another object of the present invention is to provide a shutter opening/closing mechanism for opening/covering an optical pickup suitable for an optical disc device with a slide open disc tray.

In order to achieve the above objects and other objects, in the optical disc device of the present invention, a pickup base holding an optical pickup and a spindle motor for rotating the optical disc is attached, through an elastic damper, to a disc tray that is exposed outside when loading/ejecting the optical disc. Further, a shutter, which opens/closes an opening through which laser light reaches the optical disc from the optical pickup, is movably attached to the pickup base.

In general, when the optical disc device is applied to a popular type personal computer, the disc tray is movable with respect to a frame fixed inside a computer body such that the disc tray is projected outside (the projecting position) from the frame for loading/ejecting the optical disc. In this case, it is preferable to provide an interlocking mechanism for opening/closing the shutter in conjunction with the movement of the disc tray with respect to the frame. Particularly, a preferable construction is that the disc tray slides on the frame.

In this construction, the interlocking mechanism includes a first cam provided on the frame and a shutter opening/closing lever movably attached to the pickup base, so that the shutter is opened/closed by the shutter opening/closing lever which is moved by engagement with the first cam while the pickup base slides along with the disc tray with respect to the frame. In addition, when the disc tray and the pickup base are moved to a stored position in the frame, the shutter opening/closing lever is disengaged from the first cam so that the pickup base contacts the disc tray through only the damper.

Although the shutter is closed when the disc tray is projected outside from the frame, it is preferable that a shutter lock lever is provided for locking the shutter at a closing position where the optical pickup is covered, so that it is prevented that the closed shutter is opened again while loading/ejecting the optical disc. The shutter lock lever is movably attached to the disc tray, and a second cam for moving the shutter lock lever is provided on the frame. The shutter lock lever is moved by the second cam to a lock position for locking the movement of the shutter from the closing position toward an opening position, in conjunction with the slide of the disc tray after the shutter reaches the closing position.

When the optical disc is in use, the shutter is biased by a spring to the opening position. The movement of the shutter toward the closing position is performed against the bias of the spring. While the pickup base along with the disc tray slides from the stored position to the projecting position, the shutter is moved by the shutter opening/closing lever engaged with the first cam, beyond the closing position to an over-stroke position against the bias of the spring. Then the engagement of the first cam and the shutter opening/closing lever is released so that the shutter is moved toward the opening position from the over-stroke position. Since the shutter lock lever is moved to the lock position by the second cam while the shutter moves to the over-stroke position from the closing position, the movement of the shutter toward the opening position from the over-stroke position is stopped at the closing position.

According to the present invention, since the shutter for opening/closing the opening, through which the optical pickup accesses the optical disc, is provided to the pickup base which holds the spindle motor and contacts the disc tray through the damper, the pickup base can be supported on the disc tray only by the damper when the shutter opens, and the vibration of the spindle motor or the advancing motor for optical pickup is not transmitted to the outside.

Since the shutter is opened/closed in conjunction with the movement of the disc tray between the stored position and the projecting position and is locked at the closing position while the disc tray moves toward the projecting position, the user is required only to operate this optical disc device in the same manner as the conventional optical disc device with no shutter. In addition, since the shutter is not opened even if the user carelessly touches it while the optical disc is loading/ejecting, it can be surely prevented that foreign substance or dust enters into the optical pickup or the moving mechanism for it.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8A shows a state that a second lever is not rotated with respect to a first lever, FIG. 8B shows a state that the second lever is rotated with respect to the first lever;

FIG. 14 is an explanatory view of the shutter lock lever in contact with (or engaged with) the shutter;

FIGS. 15A and 15B are explanatory views showing a movement of the shutter for covering an optical pickup, FIG. 15A shows a state that the optical pickup and the shutter are not in contact, FIG. 15B shows a state that the optical pickup and the shutter are in contact;

FIGS. 16A and 16B are explanatory views showing another type of a shutter opening/closing lever, FIG. 16A shows a state that an arm portion is not deformed, FIG. 16B shows a state that the arm portion is elastically deformed; FIG. 17A shows a state that the shutter is in a closing position, FIG. 17B shows a state that the shutter is in an opening position.

DETAILED DESCRIPTION

Figure 1:
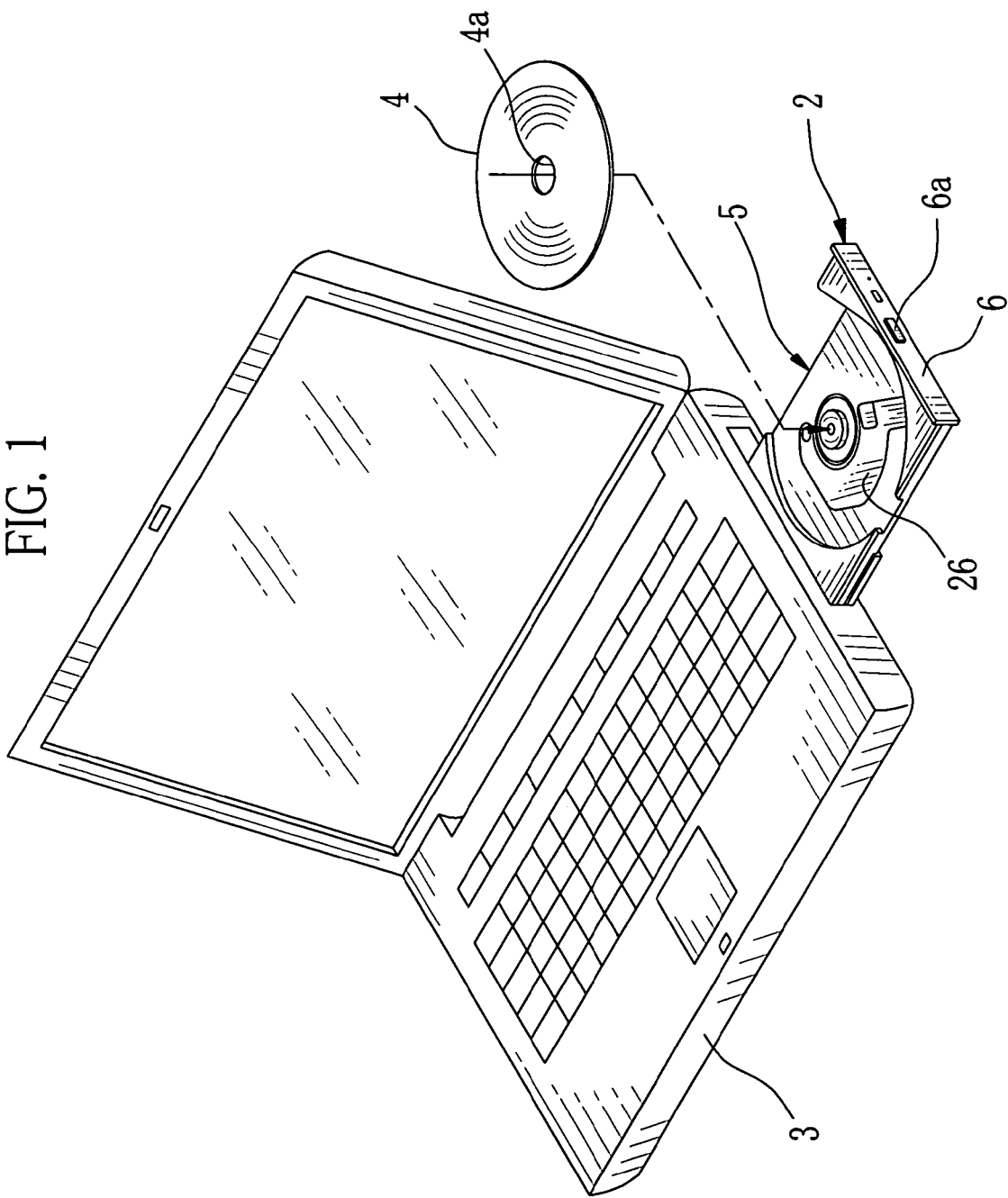
FIG. 1 is an external view of a notebook computer incorporating an optical disc device of the present invention.

As shown in FIG. 1, an optical disc device 2 is embedded in one side face of a computer body 3 of a notebook type personal computer. In this figure, a tray unit 5 is fully pulled out from the computer body 3 (the tray unit 5 is at a projecting position), for loading an optical disc 4. After loading the optical disc 4, the tray unit 5 is fully inserted into the computer body 3 and locked at this position (the tray unit 5 is at a stored position), by pressing a front cover 6 of the tray unit 5. To pull out the tray unit 5 from the computer body 3, an eject button 6a provided on the front cover 6 is pushed. When the eject button 6a is pushed, if an optical pickup is not accessing the optical disc 4, the lock of the tray unit 5 at the stored position is released. Then the tray unit 5 is projected to a predetermined stroke (for example 10 mm) by a biasing spring. A user can hold the front cover 6 to pull out the tray unit 5 to the projecting position. The optical pickup is mounted in the tray unit 5, and accesses the optical disc 4 by emitting laser light. When the tray unit 5 is pulled out from the computer body 3, a shutter 26 moves to a closing position where the optical pickup is covered.

Figure 2:
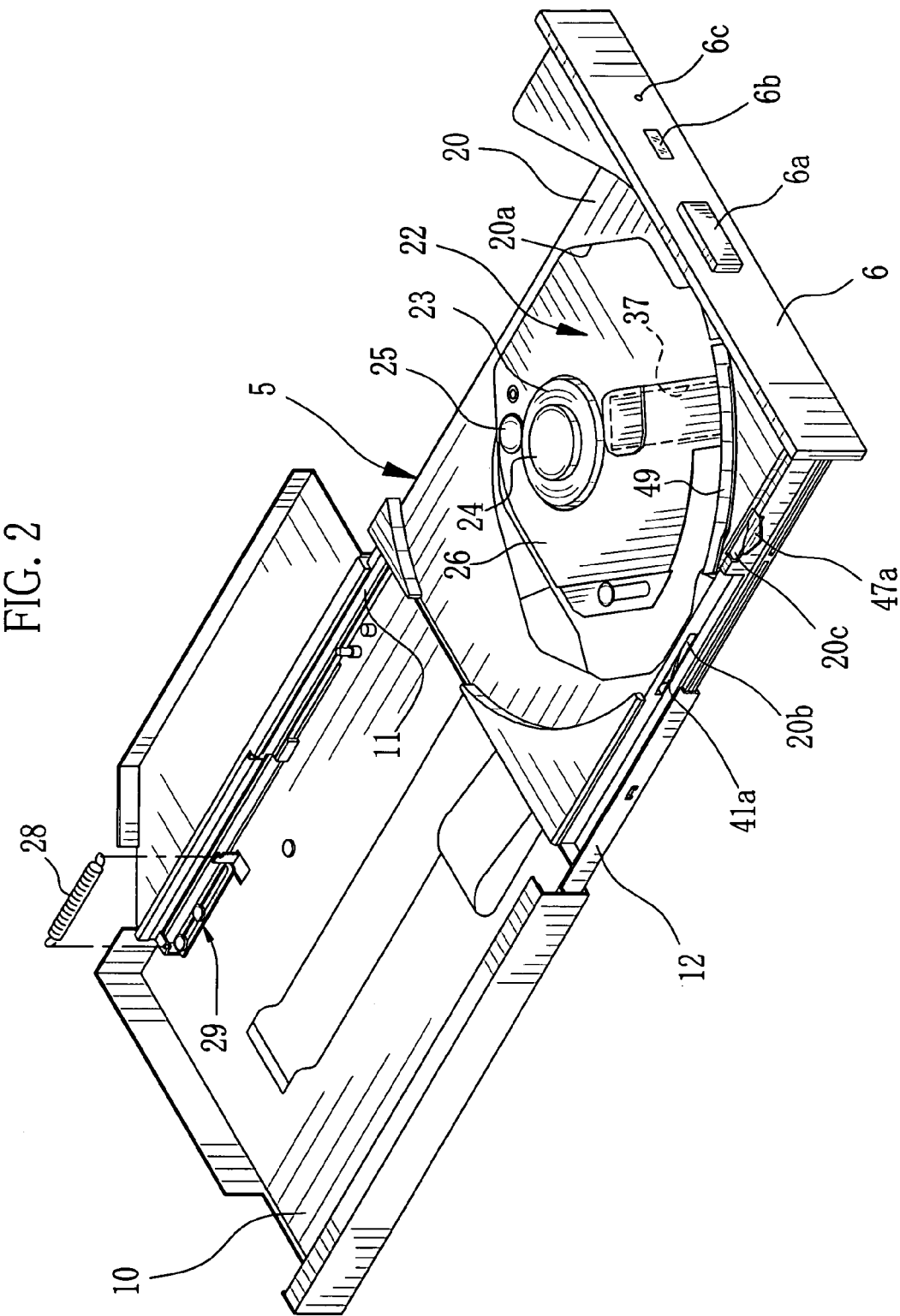
FIG. 2 is a perspective view of the optical disc device.
Figure 3:
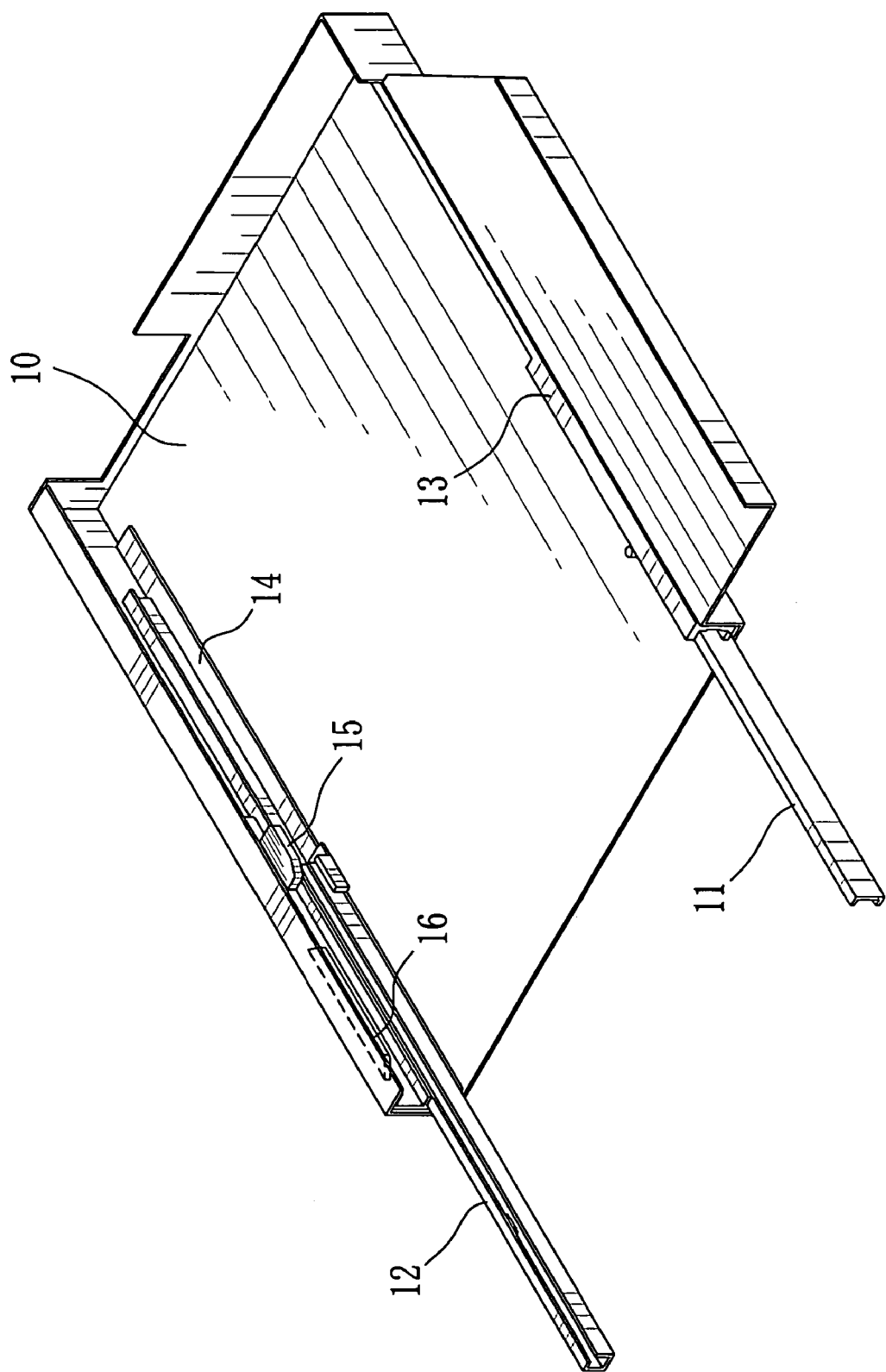
FIG. 3 is a perspective view of a frame provided with guide rails and slide rails.

As shown in FIG. 2, the optical disc device 2 comprises a thin metal plate frame 10 fixed inside the computer body 3, slide rails 11, 12 which slide along guide rails provided at both side walls of the frame 10, and the tray unit 5 which is slidably attached to the slide rails 11 and 12. As shown in FIG. 3, to inside surfaces of the side walls of the frame 10, plastic guide rails 13, 14 are fixed for guiding the movement of the slide rails 11, 12. On the guide rails 13, 14, projections and engaging portions to regulate the movement of the slide rails 11, 12 are integrally formed. Further, a shutter cam 15 and a lock cam 16 are integrally formed on the guide rail 14. These cams 15, 16 are projected inward at positions where the movement of the slide rail 12 is not interfered, and the shutter cam 15 is at lower position than the lock cam 16. Since the guide rails 13, 14, and the cams 15, 16 are fixed to the frame 10, these parts can be integrally formed with the frame 10.

As shown in FIG. 2, the tray unit 5 includes a plastic disc tray 20 having a depression corresponding to the outside diameter of the optical disc 4, and a pickup unit 22 attached to the disc tray 20 such that an opening 20a of the disc tray 20 is covered from the underside thereof. On side walls of the disc tray 20, projections and grooves are integrally formed. The projections and grooves are extended in a slide direction of the tray unit 5 to connect with the slide rails 11, 12 for guiding the slide. Accordingly, the disc tray 20 is slidably supported to the frame 10 through the slide rails 11, 12 and the guide rails 13, 14, and the pickup unit 22 is moved along with the disc tray 20 which slides. Note that stoppers are provided on the disc tray 20, the slide rails 11, 12, and the guide rails 13, 14, so that slide movements of the disc tray 20 and the slide rails 11, 12 are regulated in predetermined ranges.

The pickup unit 22 includes a spindle motor 23 for rotating the optical disc 4 and a chucking core 24 fixed at top of a drive shaft of the spindle motor 23. When the optical disc 4 is loaded on the depression of the disc tray 20, the chucking core 24 fits into a chuck hole 4a (see FIG. 1) to hold the optical disc 4. On an upper surface of the pickup unit 22, a shutter 26, which rotates around a shaft 25, is provided. The shutter 26 is locked at the closing position where the optical pickup is covered, when the tray unit 5 is pulled out from the frame 10, as shown in FIG. 2.

An eject mechanism 29 including an eject spring 28 is provided in a back side of the frame 10. When the eject button 6a is pushed to release the lock of the disc tray 20 at the stored position, the disc tray 20 is projected to the predetermined stroke from the frame 10 by the biasing force of the eject spring 28. The front cover 6 further includes an indicator 6b and an eject hole 6c. The indicator 6b displays that the optical pickup is accessing the optical disc 4. The eject hole 6c is used in an emergency, that is, when the disc tray 20 cannot be ejected by the operation of the eject button 6a because of failures, computer freeze, or the like. In this situation, the lock of the disc tray 20 can be released by inserting a hard thin wire into the eject hole 6c.

When the disc tray 20 is pushed toward the stored position from the projecting position shown in FIG. 2, the disc tray 20 slides on the slide rails 11, 12, and the slide rails 11, 12 slide on the guide rails 13, 14 fixed to the frame 10. When the disc tray 20 reaches a predetermined position in the frame 10, a hook (not shown) is engaged with the disc tray 20 while the eject spring 28 is charged. Accordingly, the disc tray 20 is mechanically locked at the stored position.

Figure 4:
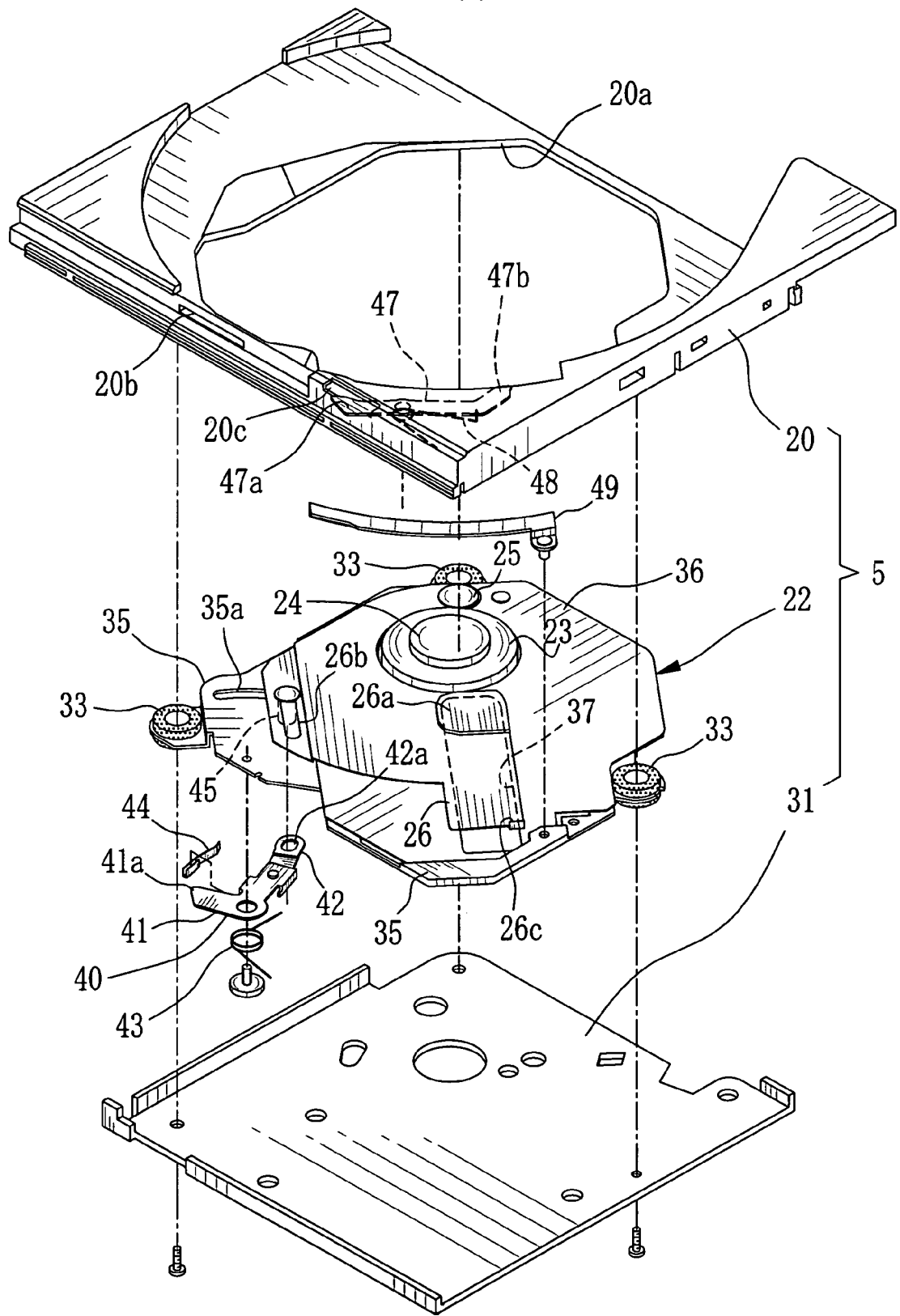
FIG. 4 is a schematic exploded perspective view of a tray unit supported by the slide rails.

As shown in FIG. 4, the tray unit 5 comprises the disc tray 20 (the illustration of the front cover 6 is omitted), the pickup unit 22, and a bottom cover 31. The bottom cover 31 is screwed to the disc tray 20 so that the pickup unit 22 is held between the disc tray 20 and the bottom cover 31. In the pickup unit 22, soft elastic rubber dampers 33 are provided at three positions for absorbing vibrations and shocks. Each upper surface of the damper 33 is lightly contacted to a bottom surface of the disc tray 20, and each lower surface of the damper 33 is lightly contacted to the bottom plate 31, when assembling the tray unit 5. Accordingly, the pickup unit 22 is elastically supported between the disc tray 20 and the bottom plate 31.

The pickup unit 22 comprises a pickup base 35 incorporating the optical pickup 32 (see FIG. 5) and a moving mechanism for the pickup, the spindle motor 23 and so on, a cover plate 36 for covering an upper surface of the pickup base 35, and the shutter 26 movable on an upper surface of the cover plate 36. An opening 37, which extends in a radius direction of the optical disc 4 from the spindle motor 23, is provided on the cover plate 36. The shutter 26 opens/closes the opening 37. When the shutter 26 opens the opening 37, the optical pickup 32 accesses the optical disc 4 through the opening 37. Since the tip of the optical pickup 32 projects approximately 0.2 mm from the upper surface of the cover plate 36, the shutter 26 has a raised area 26a which does not interfere with the optical pickup 32 when the shutter 26 is closed. Note that the shutter 26 closes the opening 37 after the optical pickup 32 returns to a home position closest to the spindle motor 23. Accordingly, the raised area 26a is not required to cover the whole area of the opening 37 along the radius direction. In addition, the optical disc 4 possibly wobbles when rotating. The amount of vertical displacement of the optical disc 4 is relatively small at the inner circumference side and relatively large at the outer circumference side. Since the raised area 26a is provided at the inner circumference side of the optical disc 4, the raised area 26a can be made small and serve to reduce the thickness of the optical disc device 2.

The shutter 26 moves around the shaft 25 in a clockwise direction, from the closing position (shown in FIG. 4) to an opening position where the opening 37 is opened. To move the shutter 26 between the closing position and the opening position, a shutter opening/closing lever 40 is attached to the pickup base 35. The shutter opening/closing lever 40 is a double lever consisting of an L-shaped first lever 41 and a second lever 42 pivotably attached to the first lever 41. The first lever 41 is attached to the pickup base 35, while being biased in a counterclockwise direction by a spring 43. The second lever 42 is biased by a leaf spring 44 attached to the first lever 41, in the clockwise direction with respect to the first lever 41. Note that a rotation end position of the second lever 42 is determined by a stopper formed by folding a portion of the first lever 41, to regulate the rotation in a clockwise direction.

As shown in FIG. 2, a tip 41a of the first lever 41 moves in/from the disc tray 20 through a slot 20b of the disc tray 20. The tip 41a has a slope which the shutter cam 15 on the guide rail 14 contacts, when the disc tray 20 reaches a predetermined position on the way to the stored position. A slot 42a is provided at a tip of the second lever 42. Into the slot 42a, a pin 45, which penetrates a slot 26b formed on the shutter 26 and an arc-slot 35a formed on the pickup base 35, is inserted. When the shutter opening/closing lever 40 is rotated in the counterclockwise direction by the bias of the spring 43, the pin 45 is also moved in the same direction to rotate the shutter 26 around the shaft 25 in the clockwise direction. Thus, the opening 37 is opened. In other words, the shutter opening/closing lever 40 that consists of the first and second levers 41 and 42, and the shutter cam 15 for displacing the shutter opening/closing lever 40, together form an interlocking mechanism for opening/closing the shutter 26 upon the slide move of the disc tray 20. The rotation amount of the shutter opening/closing lever 40 in the counterclockwise direction is regulated by a stopper integrally provided with the pickup base 35. Note that steps are formed on the cover plate 36 and the shutter 26, and the head of the pin 45 is positioned lower than the positions of the upper portions of the cover plate 36 and the shutter 26 so as not to contact the optical disc 4.

To the lower surface of the disc tray 20, a shutter lock lever 47 is pivotably attached. The shutter lock lever 47 is biased by a spring 48 in a counterclockwise direction of FIG. 4. One tip 47a of the shutter lock lever 47 is projected from the side wall of the disc tray 20 through a slot 20c, and the other tip 47b moves in/out the moving path of the shutter 26 above the cover plate 36. Note that a shutter guide 49 having an arc-shape is fixed to the pickup base 35, so that the end of the shutter 26 does not float when the shutter 26 moves along the upper surface of the cover plate 36. The shutter guide 49 has an L-shaped cross section, in which one side to the spindle motor 23 is bent downward so that the lower edge of the bent side guides the upper surface of the tip of the shutter 26. On the right side of the shutter guide 49 in FIG. 4, a stopper is formed to extend downward into the moving path of the shutter 26. The stopper contacts the front edge of the shutter 26 with respect to its rotational direction, when the shutter rotates toward the closing position in a closing direction. Accordingly, the maximum rotational position of the shutter 26 in the closing direction is determined. A tip of the shutter 26 is partially bent upward like a tongue piece, creating a lock piece 26c. The lock piece 26c passes outside the shutter guide 49 when the shutter 26 rotates.

The shutter lock lever 47 rotates below the shutter guide 49, and the other tip 47b of the shutter lock lever 47 connects with and disconnects from the lock piece 26c of the shutter 26 to lock/unlock the movement of the shutter 26. As shown in FIG. 2, when the shutter 26 is in the closing position, the shutter lock lever 47 is held in a lock position by the bias of the spring 48, and the one tip 47a is projected from the side wall of the disc tray 20. When a slope on the tip 47a contacts the lock cam 16 (see FIG. 3), during the move of the disc tray 20 to the stored position, the lock lever 47 swings in the clockwise direction to an unlocked position. Note that when the disc tray 20 is drawn from the stored position, the shutter opening/closing lever 40 is in contact (engaged) with the shutter cam 15, and the shutter lock lever 47 is apart (disengaged) from the lock cam 16, to move the shutter 26 from the opening position to the closing position and then lock it there.

Figure 5:
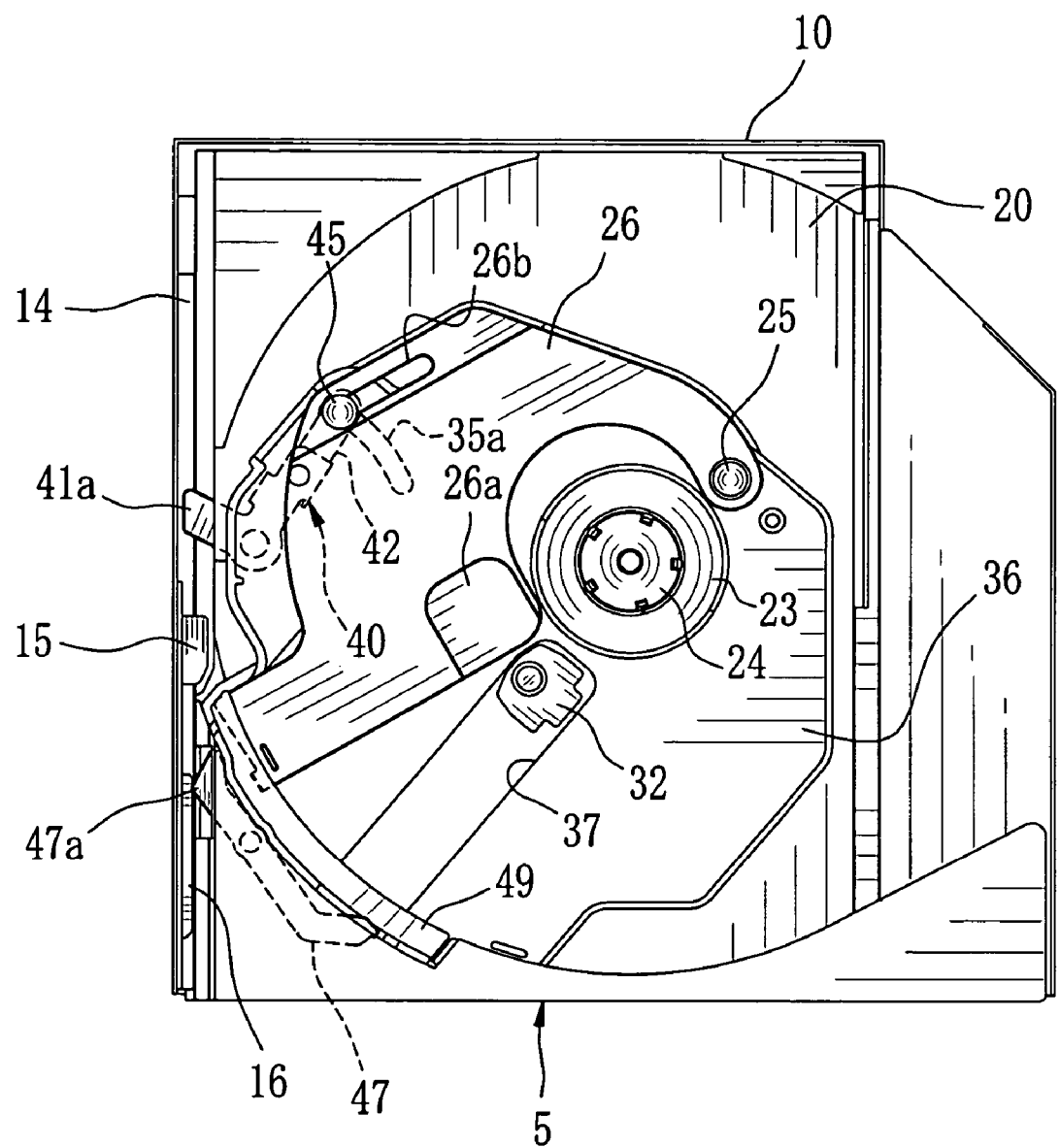
FIG. 5 is a schematic plan view of the tray unit in a stored position.

Hereinafter, the operation of the present invention according to the above configuration is described. As shown in FIG. 5, when the tray unit 5 is locked at the stored position in the computer body 3, the shutter opening/closing lever 40 is biased in the counterclockwise direction by the spring 43 (see FIG. 4), to contact the stopper integrally provided with the pickup base 35. When the shutter opening/closing lever 40 is at this position, the second lever 42 and the pin 45 position the shutter 26 at the opening position. At the opening position, the opening 37 formed in the cover plate 36 is opened to expose the optical pickup 32. Accordingly, when the optical disc 4 is loaded, the optical pickup 32 can access any position of the optical disc 4 in the radius direction, by being moved along the opening 37 by the moving mechanism.

At this time, the shutter opening/closing lever 40 is positioned behind the shutter cam 15, and the tip 41a of the first lever 41 contacts neither the shutter cam 15 nor the guide rail 14 fixed to the frame 10. In addition, the shutter lock lever 47 is biased in the counterclockwise direction by the spring 48 (see FIG. 4), so that the tip 47a thereof contacts the lock cam 16 provided on the guide rail 14. In this state, the other tip 47b of the shutter lock lever 47 is apart from the moving path of the shutter 26, and not in contact with the pickup base 35 and the cover plate 36.

As described above, since the shutter opening/closing lever 40 attached to the pickup base 35 is not in contact with other components, and the shutter lock lever 47 in contact with the lock cam 16 is attached to the disc tray 20, the pickup base 35 in the stored position is held to the disc tray 20 by only the dampers 33. In addition, since only the disc tray 20 is mechanically locked at the stored position and there is no lock to the pickup base 35, the vibrations from the drive of the spindle motor 16 or the motor for moving the optical pickup 32 are absorbed by the dampers 33. Accordingly, the vibrations are not transmitted outside the pickup base 35, which effectively prevents generation of annoying vibration sounds.

Figure 6:
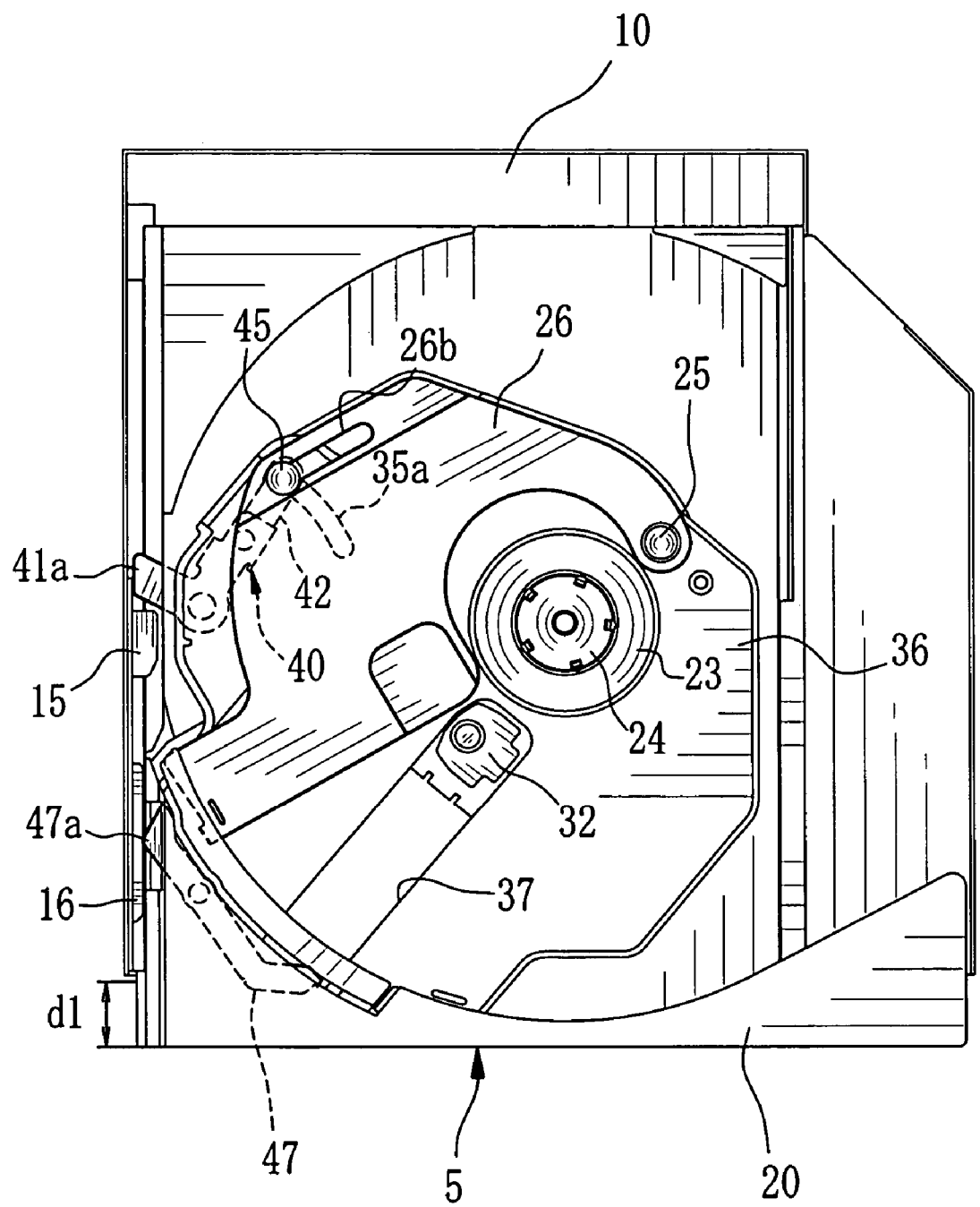
FIG. 6 is a schematic plan view of the tray unit moved a length d1 from the stored position.

To pull out the tray unit 5, the eject button 6a is pushed first. After the operation of the eject button 6a is electrically detected, the optical pickup 32 stops the access to the optical disc 4 if it is performing the access, and returns to the home position. Then the disc tray 20 is unlocked by a solenoid. Accordingly, the tray unit 5 moves to a position shown in FIG. 6, by the bias of the eject spring 28. The movement length d1 is approximately 10 mm. At this position, the tip 41a of the first lever 41 is not in contact with the shutter cam 15. Accordingly, the tray unit 5 can be surely ejected by only the bias of the eject spring 28, because resistance to eject is kept low. In addition, the tip 47a of the shutter lock lever 47 is kept in contact with the lock cam 16, thereby the shutter lock lever 47 does not rotate with respect to the disc tray 20. In this state, although the shutter 26 remains in the opening position, there is no problem because the opening 37 of the cover plate 36 is still within the frame 10.

Figure 7:
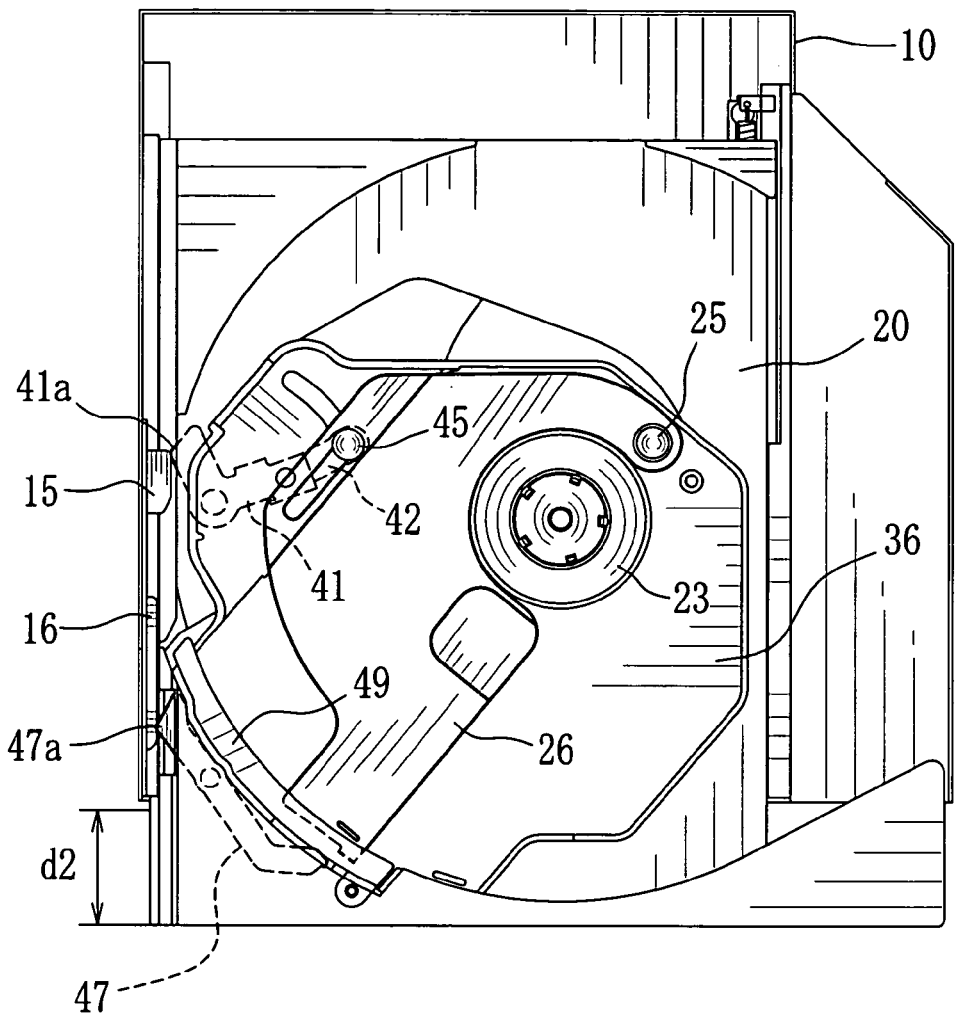
FIG. 7 is a schematic plan view of the tray unit moved a length d2 from the stored position.

Next, the user pinches the front cover 6 to pull out the tray unit 5 to a position shown in FIG. 7 (the movement length d2 is approximately 19 mm from the stored position). In this position, the slope on the tip 41a of the first lever 41 contacts the shutter cam 15, and is pushed into the disc tray 20. Accordingly, the first lever 41 is rotated in a clockwise direction by resisting the bias of the spring 43. Accompanied by the rotation of the first lever 41, the second lever 42 is also rotated in the same direction, to rotate the shutter 26 around the shaft 25 in the counter clockwise direction through the pin 45. Thus, the opening 37 of the cover plate 36 is covered by the shutter 26. Although a resisting force is applied to the second lever 42 while the shutter 26 is rotating to the closing position, there is no problem in the closing operation of the shutter 26 because the leaf spring 44 (see FIG. 4) has a biasing force larger than the resisting force.

Before the tip 41a of the first lever 41 completely runs on the upper surface of the shutter cam 15, the shutter 26 moves to the closing position shown in FIG. 7, and further moves beyond the closing position to an over stroke position where the tip of the shutter 26 contacts the stopper formed in the shutter guide 49. In addition, the first lever 41 is slightly rotated in the clockwise direction by the shutter cam 15, even after the shutter 26 reaches the over stroke position.

Figure 8A:
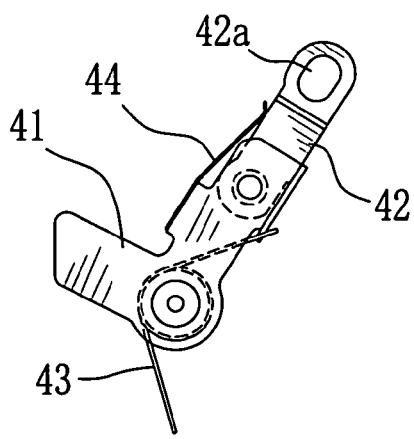
FIGS. 8A and 8B are explanatory views showing a movement of a shutter opening/closing lever.
Figure 8B:
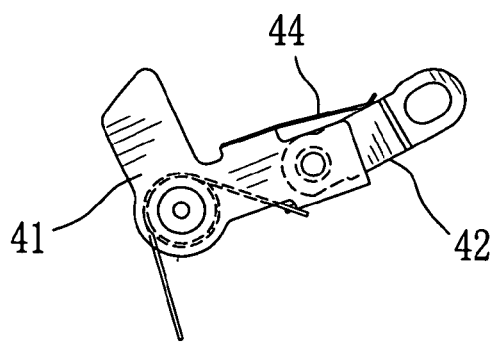

This excess rotation of the first lever 41 is absorbed by rotating the second lever 42 with respect to the first lever 41, as shown in FIGS. 8A and 8B. Since the second lever 42 is rotated by resisting the bias of the leaf spring 44, the leaf spring 44 keeps pushing the shutter 26 to the over stroke position. Thereby the shutter 26 can be reliably moved to the over stroke position. In addition, since the shutter 26 is over-stroked beyond the closing position, the shutter 26 can be reliably moved to the closing position even if there are some variations in accuracy of parts. While the shutter opening/closing lever 40 comprised of the first lever 41 and the second lever 42 performs the above-described operation, the shutter lock lever 47 does not rotate because the tip 47a of the shutter lock lever 47 is still on the upper surface of the lock cam 16.

Figure 9:
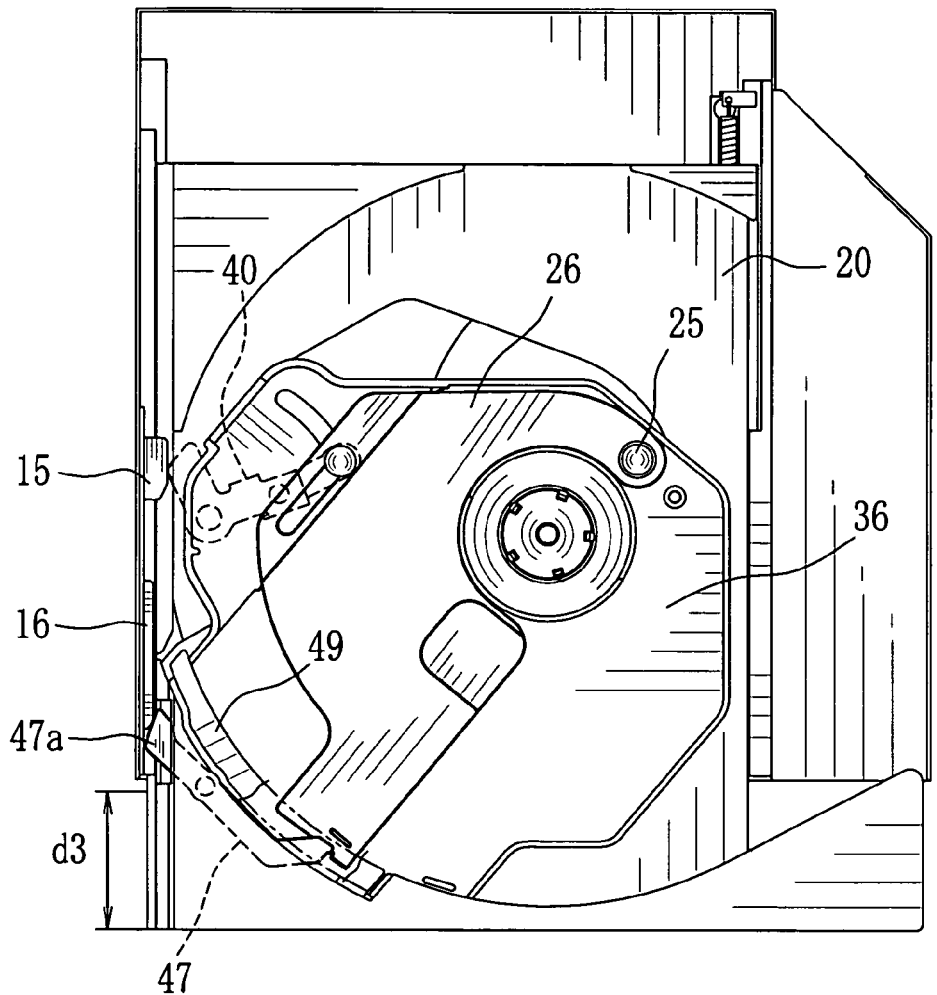
FIG. 9 is a schematic plan view of the tray unit moved a length d3 from the stored position.
Figure 10:
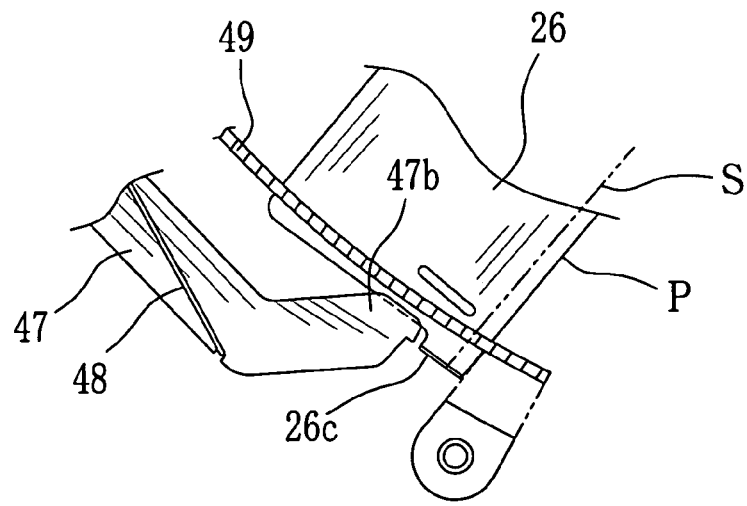
FIG. 10 is an explanatory view showing a movement of a shutter lock lever.

When the tray unit 5 is drawn to a position shown in FIG. 9 (the movement length d3 is approximately 24 mm from the stored position), the tip 47a of the shutter lock lever 47 gradually runs off the lock cam 16. Accordingly, the shutter lock lever 47 is gradually rotated in the counterclockwise direction. By this rotation, the other tip 47b of the shutter lock lever 47 comes close to the bent portion (the wall surface) of the shutter guide 49, as shown in FIG. 10 that is an enlarged illustration. The front edge P of the shutter 26 in the closing direction over-strokes beyond the closing position shown as a double-dashed line S, and contacts the stopper of the shutter guide 49. When the tray unit 5 is in the position of FIG. 9, the tip 41a of the first lever 41 is still on the upper surface of the shutter cam 15. Thus, the shutter 26 is stopped at the over stroke position by the bias of the leaf spring 44 at this stage. Note that in FIG. 9, the shutter guide 49 is shown partly broken apart.

Figure 11:
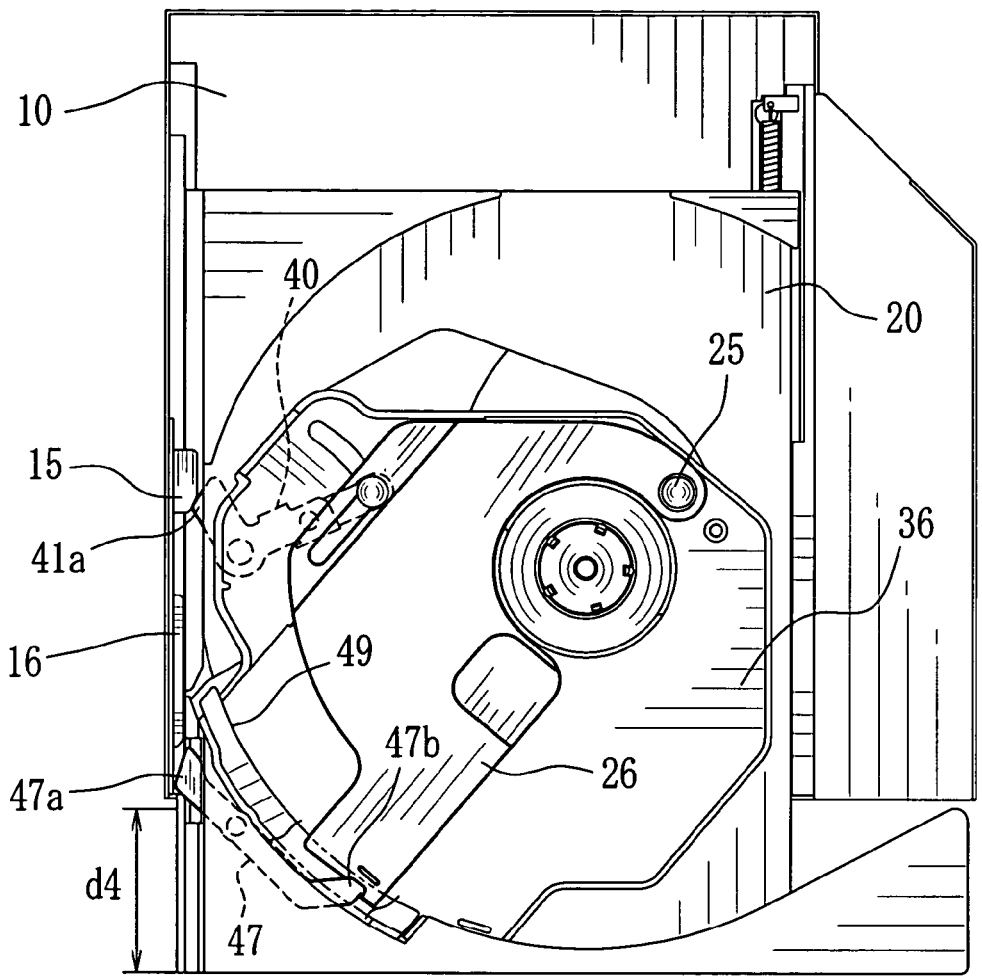
FIG. 11 is a schematic plan view of the tray unit moved a length d4 from the stored position.
Figure 12:
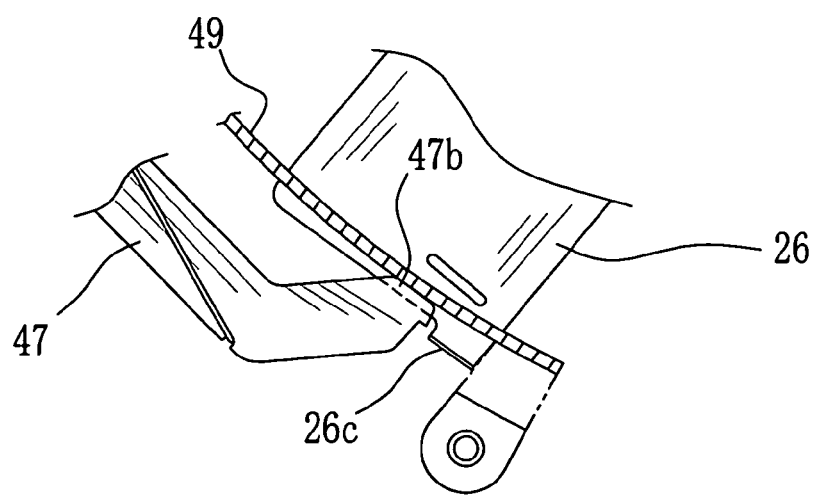
FIG. 12 is an explanatory view of the shutter lock lever whose movement is stopped.

When the tray unit 5 is further pulled out to a position shown in FIG. 11 (the movement length d4 is approximately 27 mm from the stored position), the tip 47a of the shutter lock lever 47 completely runs off the lock cam 16. Accordingly, the shutter lock lever 47 is further rotated in a counterclockwise direction. By this rotation, the other tip 47b of the shutter lock lever 47 comes in contact with the wall surface of the shutter guide 49, as shown in FIG. 12. In addition, when the tip 41a of the first lever 41 starts running off the upper surface of the shutter cam 15 as shown in FIG. 11, the first lever 41 starts rotating in the counterclockwise direction by the bias of the spring 43. The second lever 42 changes from the state in FIG. 8B to the state in FIG. 8A according to this rotation of the first lever 41. Thereby the biasing force to the shutter 26 from the leaf spring 44 is gradually reduced.

Figure 13:
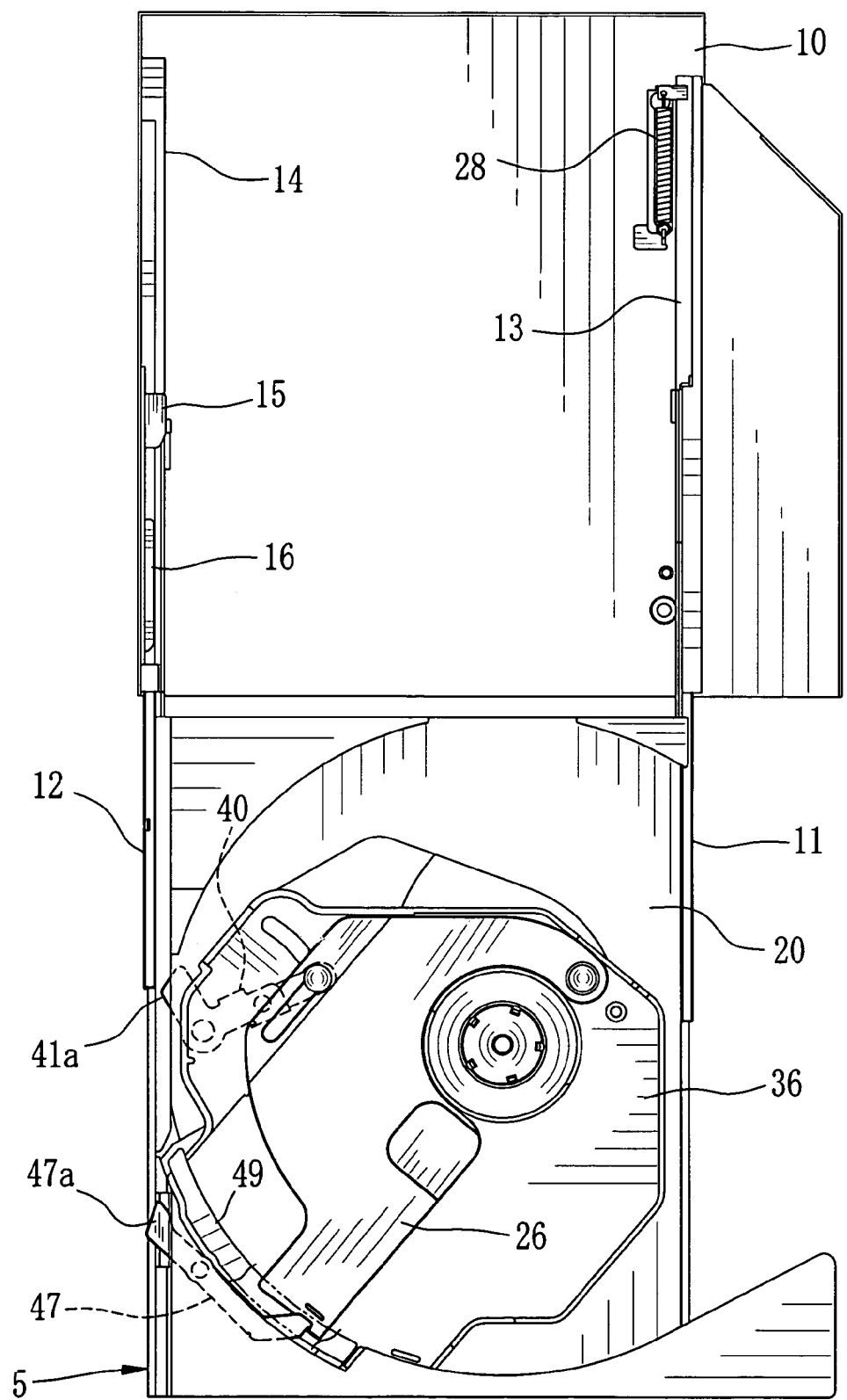
FIG. 13 is a schematic plan view of the tray unit that reached a projecting position.

When the tray unit 5 is pulled out to a position shown in FIG. 13, where the tip 41a of the first lever 41 is apart from the shutter cam 15, the first lever 41 is further rotated in a counterclockwise direction by the bias of the spring 43. According to this rotation, the second lever 42 is also rotated in the same direction, to rotate the shutter 26 around the shaft 25 in a clockwise direction (the opening direction). However, as shown in FIG. 12, at the point where the tip 41a of the first lever 41 is separated from the shutter cam 15, the other tip 47b of the shutter lock lever 47 enters in the moving path of the lock piece 26c of the shutter 26. Accordingly, as shown in FIG. 14, when the front edge P of the shutter 26 returns to a position indicated in a solid line from the over-stroke position indicated in a double-dashed line T, the lock piece 26c contacts the other tip 47b of the shutter lock lever 47 such that the rotation of the shutter 26 in the clockwise direction is stopped. Thereby the shutter 26 is held at the closing position. As described in the figure, there is a hook portion integrally formed on the tip 47b of the shutter lock lever 47. The hook portion enters inside the lock piece 26c. Accordingly, even if the distance between the shaft 25 and the lock piece 26c varies to some degree by a fabrication error or a backlash, or the user carelessly pushes the tip 47a of the shutter lock lever 47 inward, the rotation of the shutter 26 in the opening direction can be prevented.

As described above, while the tray unit 5 is moved from the stored position shown in FIG. 5 to the projecting position shown in FIG. 13, the shutter 26 is closed before the opening 37 of the cover plate 36 comes outside the computer body 3 (FIG. 7). When the closed shutter 26 is slightly exposed outside, the shutter 26 is moved beyond the closing position to the over-stroke position, and the leaf spring 44 biases the shutter 26 to the closing direction (FIG. 9 and FIG. 11). When the tray unit 5 is drawn out to the position where the user can touch the shutter 26, the shutter lock lever 47 is moved to the lock position to stop the movement of the shutter 26 in the opening direction. Accordingly, it can be prevented that the user carelessly touches the optical pickup 32 and foreign substances or dust enter into the opening 37 when loading or ejecting the optical disc 4. In addition, when the tray unit 5 is drawn to the position where the shutter 26 is largely exposed outside, the opening 37 is not opened even if the user carelessly touches the shutter 26, because the movement of the shutter 26 in the opening direction is locked.

While the tray unit 5 is moved from the projecting position to the stored position, the shutter cam 15 comes in contact with the shutter opening/closing lever 40, and the lock cam 16 is disengaged from the shutter lock lever 47, to move the shutter 26 from the opening position to the closing position. According to the movement of the tray unit 5, at first, the tip 41a of the first lever 41 runs on the shutter cam 15, thereby the shutter 26 is moved in the closing direction from the closing position to the over-stroke position where the lock piece 26c is separated from the other tip 47b of the shutter lock lever 47. Next, the tip 47a of the shutter lock lever 47 runs on the lock cam 16 to rotate the shutter lock lever 47 in a clockwise direction, thereby the other tip 47b moves away from the moving path of the lock piece 26c. Corresponding to the further movement of the tray unit 5, the tip 41a of the first lever 41 runs off the shutter cam 15, thereby the shutter opening/closing lever 40 is rotated in a counterclockwise direction by the bias of the spring 43, to open the shutter 26. After that, the shutter 26 is kept at the opening position, and when the tray unit 5 reaches the stored position, the disc tray 20 is mechanically locked in the state shown in FIG. 5.

By the way, there is a case that the lock of the tray unit 5 in the stored position cannot be released by the operation of the eject button 6a, when the computer freezes or during trouble while the optical disc 4 is used. Under these conditions, the lock of the tray unit 5 can be manually released by inserting the hard thin wire into the eject hole 6c. However, when the manual release is performed, the optical pickup 32 often fails to return to the home position. As described above, the tip of the optical pickup 32 projects approximately 0.2 mm from the upper surface of the cover plate 36. When the shutter 26 is moved in the closing direction according to the draw of the tray unit 5 while the optical pickup 32 is not in the home position, it is possible that a part of the shutter 26 except the raised area 26a contacts the upper end of the optical pickup 32 that is slightly projected.

In considering this problem, the optical pickup 32 has a lens holder 51 for holding an objective lens 50, and a protector 52 provided on the upper surface of the lens holder 51, as shown in FIG. 15A. Since the protector 52 is positioned above the objective lens 50, the objective lens 50 is prevented from directly contacting the optical disc 4 or the shutter 26 and being damaged. From the upper surface of the cover plate 36, the protector 52 and a part of the lens holder 51 are projected through the opening 37. A slope 53 is formed across side surfaces of the lens holder 51 and the protector 52. As shown in FIG. 15B, when the shutter 26 moves to close the opening 37 and the front edge of the shutter 26 contacts the slope 53, the lens holder 51 and the protector 52 are pushed downward in the figure.

The optical pickup 32 can be moved in the direction of the laser light (vertical direction in the figure) for controlling the focus of the laser light, and also in the direction perpendicular to that of the laser light. Accordingly, when the slope 53 is pushed by the shutter 26 moving in the closing direction, the lens holder 51 slides downward toward the lower surface of the shutter 26. According to this construction, the objective lens 50 and the lens holder 51 are not damaged even if the shutter 26 is closed by the emergency ejecting operation or the like in which the optical pickup 32 is not at the home position.

One of the features of the present invention is that the shutter 26 over-strokes from the closing position and is biased toward the over-stroke position until the shutter lock lever 47 moves to the lock position. In the above embodiment, to realize the above feature, the shutter opening/closing lever 40 is the double lever constituted of the first lever 41 and the second lever 42, and the leaf spring 44 biases the second lever 42 to push the shutter 26 in the closing direction after the first lever 41 is completely rotated. However, the feature can be realized by using a lever 56 shown in FIGS. 16A and 16B instead of the shutter opening/closing lever 40.

As shown in FIG. 16A, the lever 56 has a tip that extends from an axis 57 to the elongated hole 56b, and has flexibility. Accordingly, while the tip 56a gradually runs on the shutter cam 15 and the lever 56 rotates, the arm portion 58 is elastically deformed as shown in FIG. 16B in correspondence with running of the tip 56a, after the shutter 26 contacts the stopper at the over-stroke position. By this deformation of the arm portion 58, the excess rotation of the tip 56a is absorbed. In addition, since the deformed arm portion 58 generates a biasing force to push the shutter 26 to the closing direction just like the previous embodiment, the shutter 26 can be kept at the over-stroke position.

Figure 17A:
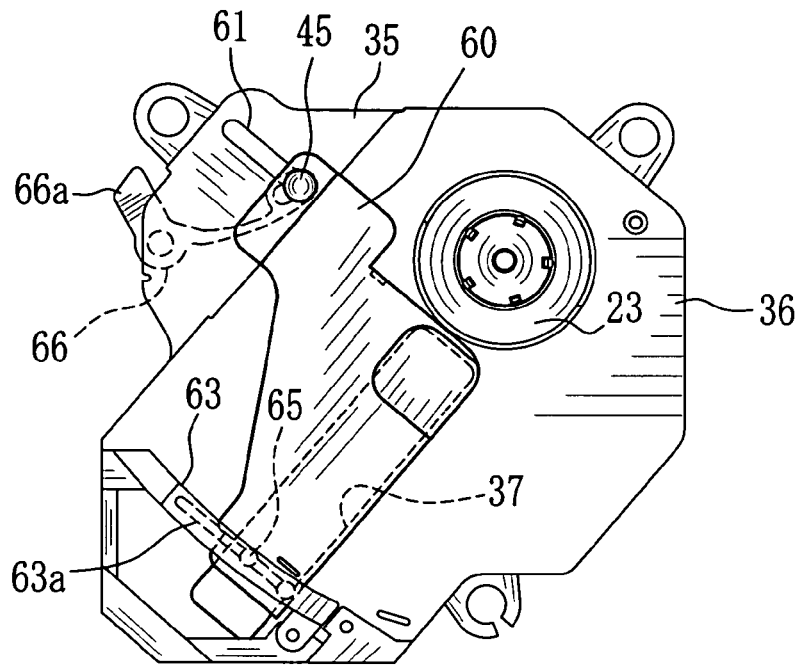
FIGS. 17A and 17B are explanatory views showing another embodiment with use of a slide type shutter.
Figure 17B:
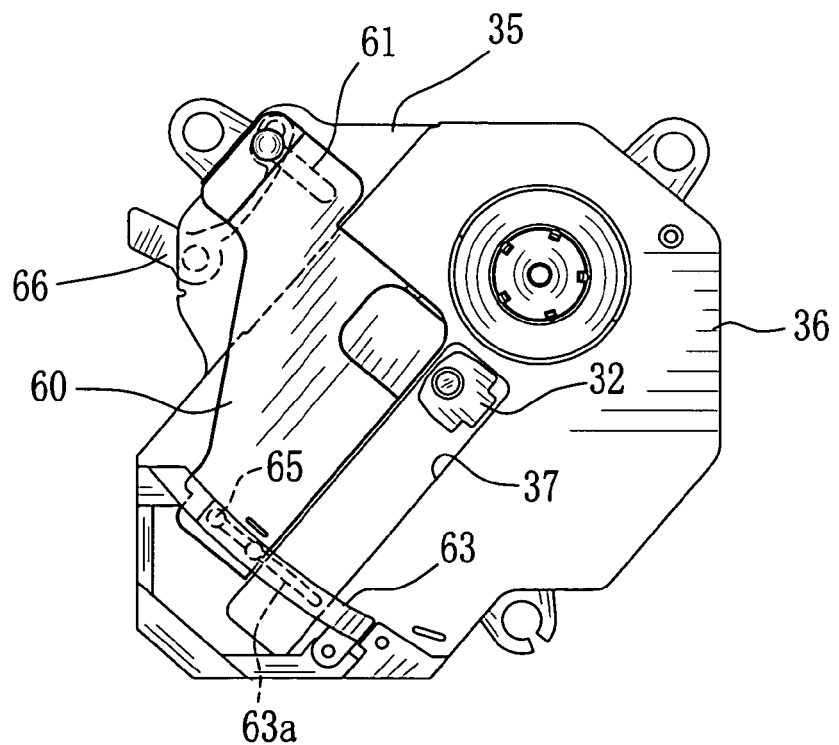

In the present invention, the type of the shutter is not limited to the shutter 26 which rotates for opening/closing the opening 37. A slide type shutter 60 shown in FIG. 17A can be used on the upper surface of the cover plate 36. Note that in FIGS. 17A and 17B, the members having the same functions as those described in the above embodiment are given the same numerals, and the illustration of the disc tray 20 is omitted. The pin 45 penetrates the shutter 60, and is inserted into a linear slot 61 formed on the pickup base 35. The shutter 60 slides along the slot 61 through the pin 45, to open/close the opening 37 on the cover plate 36. In addition, a guide slot 63a parallel to the slot 61 is formed in a shutter guide 63 which guides the shutter 60 to prevent the floating of the end of the shutter 60. A pair of pins 65, which is implanted in the end portion of the shutter 60, is inserted into the guide slot 63a. A shutter opening/closing lever 66 has a similar construction to the lever 56 of the FIG. 16A, and a tip 66a of the shutter opening/closing lever 66 becomes in contact with and apart from the shutter cam 15, so that the shutter 60 is moved between the closing position shown in FIG. 17A and the opening position shown in FIG. 17B. Note that the shutter lock lever for locking the shutter 60 at the closing position in this embodiment is not different from one in the first embodiment, and therefore explanation and illustration thereof is omitted.

The preferred embodiments of the present invention are described above with reference to the figures. However, other embodiments are within the scope of the present invention. For example, the disc tray can be slidably supported by only guide rails fixed on the frame, although the slide rails 13, 14 are provided between the disc tray 20 and the guide rails 11, 12 fixed to the frame 10 for reducing the length of the slide mechanism in the slide direction in the above embodiment. In addition, the disc tray may be rotatably supported on a frame embedded in the computer body, so that the disc tray is rotated between the stored position and the projecting position. In this case, the shutter cam and the lock cam are provided along the rotation path of the disc tray so as to open, close and lock the shutter in accordance with the rotation of the disc tray.

In the above embodiment, the shutter cam 15 and the lock cam 16 are projected inward from the guide rail 14. However, these cams may be cam grooves cut into the guide rail 14. In this case, to obtain the same operation as the above embodiment, the interlocking systems are modified such that the rotational directions of the shutter opening/closing lever 40 and the shutter lock lever are respectively reversed.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

The embodiments of the invention in which an exclusive property or privilege is claimed are defined as follows:

1. An optical disc device comprising:
   a disc tray exposed outside when an optical disc is loaded therein or ejected therefrom;
   a frame movably and slidably supporting said disc tray between a stored position where said disc tray is contained within said frame when said optical disc is used, and a projecting position where said disc tray is projected outside from said frame when loading or ejecting said optical disc;
   a pickup base which holds an optical pickup and a spindle motor for rotating said optical disc and is supported on said disc tray through a damper having an elastic property, said optical pickup emitting laser light to access said optical disc;
   a shutter movably attached to said pickup base, which is at an opening position where said optical pickup can access said optical disc when said optical disc is used, and at a closing position for covering said optical pickup when loading or ejecting said optical disc; and
   an interlocking mechanism for opening or closing said shutter in conjunction with said movement of said disc tray between said stored position and said projecting position; said interlocking mechanism comprising a first cam provided on said frame and a shutter opening/closing lever movably attached to said pickup base,
   said shutter being moved between said opening position and said closing position by said shutter opening/closing lever which contacts and leaves said first cam to change positions while said pickup base slides along with said disc tray between said stored position and said projecting position.

2. An optical disc device claimed in claim 1, wherein said shutter opening/closing lever is separated from said first cam when said pickup base reaches said stored position along with said disc tray.

3. An optical disc device claimed in claim 2, further comprising a second cam provided on said frame and a shutter lock lever movably attached to said disc tray,
   said shutter lock lever contacting and leaving said second cam to move between a lock position for locking a movement of said shutter from said closing position toward said opening position and an unlock position for unlocking said movement of said shutter, while said disc tray slides on said frame.

4. An optical disc device claimed in claim 3, wherein said shutter is biased toward said opening position by a first spring,
   said shutter being moved from said opening position to an over-stroke position beyond said closing position against the bias of said first spring by the contact of said shutter opening/closing lever and said first cam while said pickup base moves along with said disc tray from said stored position to said projecting position, then being moved by the bias of said first spring from said over-stroke position toward said opening position after said contact of said first cam and said shutter opening/closing lever is released,
   said shutter lock lever releasing the contact with said second cam to move to said lock position while said shutter moves to said over-stroke position from said closing position, so that the movement of said shutter toward said opening position from said over-stroke position is stopped at said closing position.

5. An optical disc device claimed in claim 4, wherein said shutter opening/closing lever comprises:
   a first lever rotatably attached to said pickup base;

a second lever one side thereof being rotatably attached to said first lever, and the other side thereof being rotatably attached to said shutter;

said first spring for biasing to rotate said first lever with respect to said pickup base, in a direction to open said shutter; and a second spring for biasing to rotate said second lever with respect to said first lever, in a direction to close said shutter.

6. An optical disc device claimed in claim 4, wherein said shutter opening/closing lever comprises:

a first attachment portion through which said shutter opening/closing lever is rotatably attached to said pickup base;

a second attachment portion through which said shutter opening/closing lever is rotatably attached to said shutter; and a flexible arm portion extending from said first attachment portion to said second attachment portion.

7. An optical disc device claimed in claim 1, wherein said optical pickup includes:

a lens holder for holding an objective lens; and a protector for preventing a direct contact between said objective lens and said shutter.

8. An optical disc device claimed in claim 7, further including a slope formed across side surfaces of said lens holder and said protector, said lens holder and said protector being pushed downward by said shutter toward a lower surface of said shutter when said shutter moves toward the closing position and contacts said slope.

9. An optical disc device claimed in claim 1, wherein said shutter is attached to said pickup base rotatably around a shaft, and a tip of said shutter opening/closing lever being attached to a pin penetrating a slot formed on said shutter and an arc-slot formed on said pickup base.

10. An optical disc device claimed in claim 1, wherein said shutter is provided with a pin, which penetrates a linear slot provided in said pickup base and is attached to a tip of said shutter opening/closing lever.

* * * * *